(12) United States Patent
Koreki

(10) Patent No.: US 7,483,071 B2
(45) Date of Patent: Jan. 27, 2009

(54) IMAGE SENSING APPARATUS HAVING AUTOFOCUS CONTROL FUNCTION

(75) Inventor: Taku Koreki, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 929 days.

(21) Appl. No.: 10/877,206

(22) Filed: Jun. 25, 2004

(65) Prior Publication Data

US 2004/0263674 A1 Dec. 30, 2004

(30) Foreign Application Priority Data

Jun. 30, 2003 (JP) ............................. 2003-187903
May 14, 2004 (JP) ............................. 2004-144617

(51) Int. Cl.
*G03B 13/00* (2006.01)
*H04N 5/232* (2006.01)

(52) U.S. Cl. ...................................... 348/345; 348/349

(58) Field of Classification Search .................. 348/345, 348/220.1, 356
See application file for complete search history.

(56) References Cited

U.S. PATENT DOCUMENTS

| | | | |
|---|---|---|---|
| 5,715,483 A | 2/1998 | Omata et al. | |
| 5,815,748 A * | 9/1998 | Hamamura et al. | 396/104 |
| 6,373,525 B1 * | 4/2002 | Nishiyama | 348/345 |
| 6,812,969 B2 * | 11/2004 | Ide et al. | 348/346 |
| 6,871,010 B1 * | 3/2005 | Taguchi et al. | 386/120 |
| 7,236,696 B2 * | 6/2007 | Higuma et al. | 396/133 |
| 2003/0048372 A1 | 3/2003 | Yasuda | |
| 2003/0197804 A1 * | 10/2003 | Ito | 348/345 |

FOREIGN PATENT DOCUMENTS

| | | |
|---|---|---|
| CN | 1402077 A | 3/2003 |
| EP | 0 794 660 A1 | 9/1997 |
| JP | 04-318509 A | 11/1992 |
| JP | 2001-066494 A | 3/2001 |
| JP | 2001-111934 A | 4/2001 |
| JP | 2001-255457 A | 9/2001 |
| JP | 2002-214517 A | 7/2002 |
| JP | 2003-015023 A | 1/2003 |
| JP | 2003-140035 A | 5/2003 |
| KR | 1999-0039780 A | 6/1999 |

* cited by examiner

*Primary Examiner*—Lin Ye
*Assistant Examiner*—Euel K Cowan
(74) *Attorney, Agent, or Firm*—Frishauf, Holtz, Goodman & Chick, P.C.

(57) ABSTRACT

When the start of still picture AF operation is designated during moving picture pick-up/recording, the current position of an AF lens is acquired, and the AF lens is moved by X addresses from the lens position. The AF lens is moved to the Yth address in an opposite direction from the lens position to which the AF lens has been moved by X addresses, and an AF evaluation value is detected for each address. Whether the peak value of the AF evaluation value has been detected is determined. If so, whether the peak value is larger than the threshold is determined. If the peak value is determined larger, the AF lens is-moved to a lens position at which the peak value has been obtained. Hence, still picture AF operation can be performed within a short time during moving picture pick-up/recording.

20 Claims, 13 Drawing Sheets

IMAGE SENSING APPARATUS HAVING AUTOFOCUS CONTROL FUNCTION

CROSS-REFERENCE TO RELATED APPLICATIONS

This application is based upon and claims the benefit of priority from prior Japanese Patent Applications No. 2003-187903, filed Jun. 30, 2003; and No. 2004-144617 filed May 14, 2004, the entire contents of both of which are incorporated herein by reference.

BACKGROUND OF THE INVENTION

1. Field of the Invention

The present invention relates to an image sensing apparatus and auto focus control method therefor and, more particularly, to an image sensing apparatus having a still picture pick-up function and moving picture pick-up function and an auto focus control method therefor.

2. Description of the Related Art

A typical conventional auto focus (to be referred to as AF hereinafter) control method for digital cameras as a kind of image sensing apparatus is contrast detection. In contrast detection, the magnitude of the contrast component (high-frequency component) in an image signal periodically output from an image sensing element such as a CCD is evaluated while the focus lens is moved. The focus lens is moved to a lens position at which the evaluation value maximizes, thereby focusing the lens.

BRIEF SUMMARY OF THE INVENTION

The present invention is directed to method and apparatus that substantially obviates one or more of the problems due to limitations and disadvantages of the related art, and has as its object to provide an image sensing apparatus capable of greatly shortening the time necessary for AF operation based on contrast detection, and an auto focus control method therefor.

According to an embodiment of the present invention, an image sensing apparatus comprises:

an image sensor which senses an object image which is incident through a focus lens;

an auto focus unit which moves the focus lens along an optical axis and moves the focus lens to an in-focus lens position based on an image sensing signal output from the image sensor during movement of the focus lens;

a moving picture pick-up control unit which causes the image sensor to execute a moving picture pick-up process;

a first auto focus control unit which causes the auto focus unit to execute a first auto focus process for a moving picture pick-up when the moving picture pick-up control unit executes the moving picture pick-up process;

an auto focus designation unit which designates a start of an auto focus process for a still picture pick-up when the moving picture pick-up control unit executes the moving picture pick-up process; and a second auto focus control unit which causes the auto focus unit to execute a second auto focus process for a still picture pick-up when the auto focus designation unit designates the start of the auto focus process and causes the auto focus unit to limit movement of the focus lens within a range narrower than a movable range of the focus lens.

According to another embodiment of the present invention, an image sensing apparatus comprises:

an image sensor which senses an object image which is incident through a focus lens;

an auto focus unit which moves the focus lens along an optical axis and moves the focus lens to an in-focus lens position based on an image sensing signal output from the image sensor during movement of the focus lens;

a moving picture pick-up control unit which causes the image sensor to execute a moving picture pick-up process;

a first auto focus control unit which causes the auto focus unit to execute a first auto focus process for a moving picture pick-up when the moving picture pick-up control unit executes the moving picture pick-up process;

an auto focus designation unit which designates a start of an auto focus process for a still picture pick-up;

a second auto focus control unit which causes the auto focus unit to execute a second auto focus process for a still picture pick-up when the auto focus designation unit designates the start of the auto focus process while the moving picture pick-up control unit executes the moving picture pick-up process; and a third auto focus control. unit which causes the auto focus unit to execute a third auto focus process for a still picture pick-up in which a processing time is shorter than in the second auto focus process when the auto focus designation unit designates the start of the auto focus process while the moving picture pick-up process and the first auto focus process are executed.

According to another embodiment of the present invention, an image sensing apparatus comprises:

means for sensing an object image which is incident through a focus lens;

auto focus means for moving the focus lens along an optical axis and moving the focus lens to an in-focus lens position based on an image sensing signal output from the image sensor during movement of the focus lens;

moving picture pick-up control means for causing the image sensor to execute a moving picture pick-up process;

first auto focus control means for causing the auto focus means to execute a first auto focus process for a moving picture pick-up when the moving picture pick-up control means executes the moving picture pick-up process;

auto focus designation means for designating a start of an auto focus process for a still picture pick-up when the moving picture pick-up control means executes the moving picture pick-up process; and second auto focus control means for causing the auto focus means to execute a second auto focus process for a still picture pick-up when the auto focus designation means designates the start of the auto focus process and causing the auto focus means to limit movement of the focus lens within a range narrower than a movable range of the focus lens.

According to another embodiment of the present invention, an auto focus method comprises:

causing an image sensor which senses an object image which is incident through a focus lens to execute a moving picture pick-up process and a contrast auto focus process for a moving picture pick-up;

designating a start of a contrast auto focus process for a still picture pick-up when the moving picture pick-up process and the contrast auto focus process for a moving picture pick-up are executed; and performing the contrast auto focus process for the still picture pick-up for limiting movement of the focus lens within a range narrower than a movable range of the focus lens when the start of the contrast auto focus process for the still picture pick-up is designated.

According to another embodiment of the present invention, an article of manufacture comprising a computer usable medium having an auto focus control program embodied therein, the auto focus control program comprises:

computer readable program code means for causing a computer to cause an image sensor which senses an object image which is incident through a focus lens to execute a moving picture pick-up process and a contrast auto focus process for a moving picture pick-up;

computer readable program code means for causing a computer to designate a start of a contrast auto focus process for a still picture pick-up when the moving picture pick-up process and the contrast auto focus process for a moving picture pick-up are executed; and computer readable program code means for causing a computer to perform the contrast auto focus process for the still picture pick-up for limiting movement of the focus lens within a range narrower than a movable range of the focus lens when the start of the contrast auto focus process for the still picture pick-up is designated.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

Figure 1:
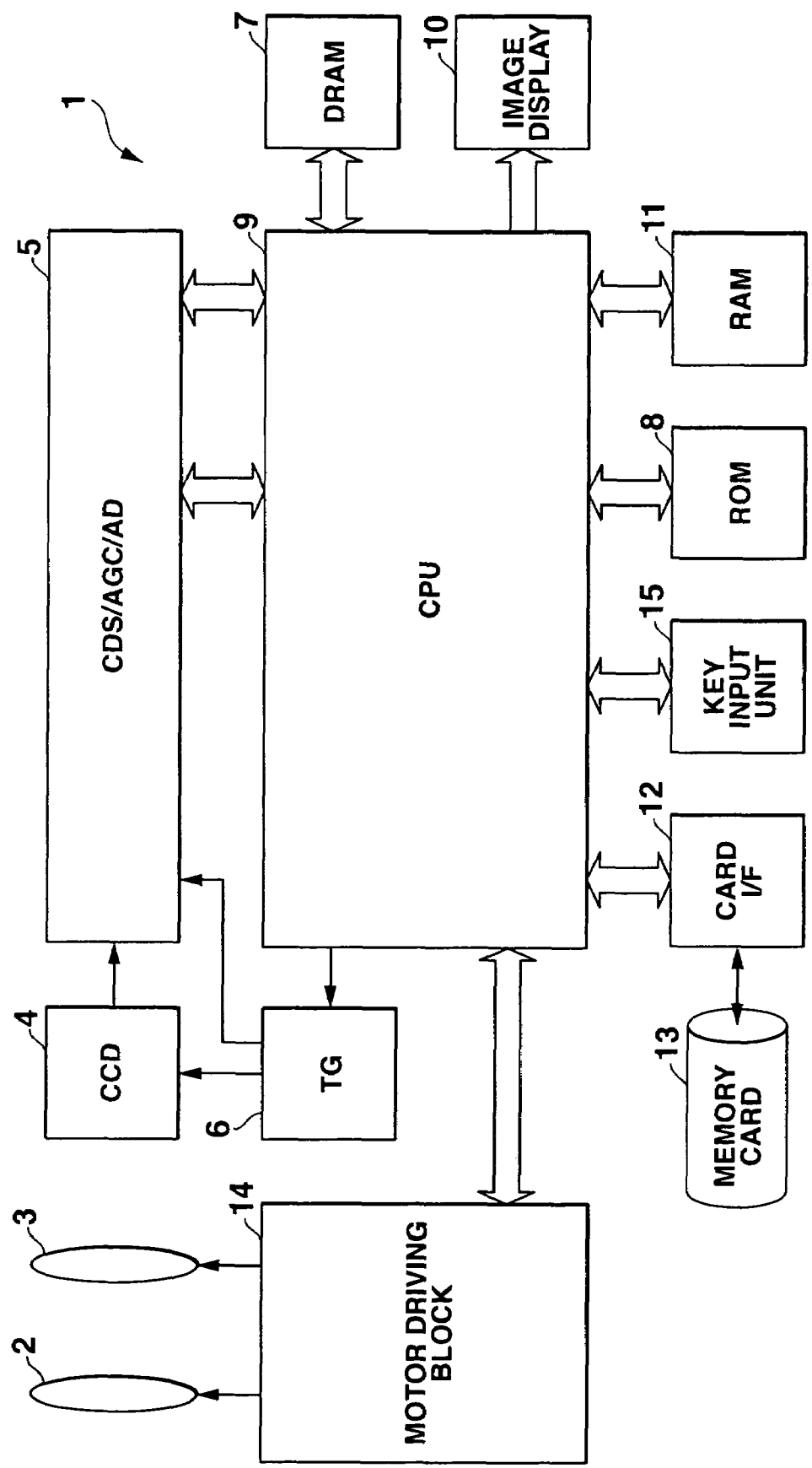
FIG. 1 is a block diagram showing a digital camera according to an embodiment of the present invention.

Embodiments of an image sensing apparatus according the present invention will be described below with reference to the several views of the accompanying drawing. FIG. 1 is a block diagram showing the arrangement of the first embodiment. The first embodiment will explain a digital camera.

First Embodiment

FIG. 1 is a block diagram showing the schematic arrangement of a digital camera 1. The digital camera 1 has an AF function based on contrast detection. The digital camera 1 comprises a focus lens 2, zoom lens 3, CCD 4, unit circuit 5, TG (Timing Generator) 6, DRAM 7, ROM 8, CPU 9, image display 10, RAM 11, card interface 12, motor driving block 14, and key input unit 15. A memory card 13 freely detachably inserted into the card slot (not shown) of a camera body is connected to the card interface 12.

Each of the focus lens 2 and zoom lens 3 includes lenses (not shown). Although not shown, the motor driving block 14 is formed by a focus motor and zoom motor which drive the focus lens and zoom lens along the optical axis, and motor drivers which respectively drive the focus motor and zoom motor in accordance with control signals sent from the CPU 9.

The CCD 4 photoelectrically converts an object image projected through the focus lens 2 and zoom lens 3 into an image sensing signal, and outputs the image sensing signal to the unit circuit 5. The CCD 4 is driven by a timing signal of a predetermined frequency generated by the TG 6. The TG 6 is connected to the unit circuit 5. The unit circuit 5 is comprised of a CDS (Correlated Double Sampling) circuit which performs correlated double sampling for an image sensing signal output from the CCD 4 and holds the processed signal, a gain control amplifier (AGC) which amplifies the image sensing signal, and an A/D converter (AD) which converts the amplified image sensing signal into a digital signal. An output signal from the CCD 4 is sent as a digital signal to the CPU 9 through the unit circuit 5.

The image display 10 includes a color LCD and its driving circuit. In a pick-up standby state, the image display 10 displays an object image sensed by the CCD 4 as a through image (viewfinder image). In playing back a recorded image, the image display 10 displays a recorded image (still or moving picture) which is read out from the memory card 13 and expanded. The key input unit 15 includes a plurality of operation keys (e.g., a shutter button, a recording start/end button used to pick up a moving picture, a pick-up mode switching key, a power key, and a MENU key). The key input unit 15 outputs to the CPU 9 a key input signal corresponding to key operation by the user. The shutter button is a two-step switch which outputs different output signals in response to a half stroke and full stroke.

The DRAM 7 is used as a buffer memory which temporarily stores object image data digitized after image sensing by the CCD 4, and also as a working memory for the CPU 9. The ROM 8 and RAM 11 store control programs necessary to control respective units (e.g., the motor driving block 14, DRAM 7, and image display 10) by the CPU 9. That is, the ROM 8 and RAM 11 store programs necessary for control operations including AF (Auto Focus control) and AE (Auto Exposure control), and data (e.g., threshold) necessary to control the respective units.

The CPU 9 controls the focus lens 2 by sending a control signal to the motor driving block 14 in accordance with control information or data stored in the ROM 8 or RAM 11. Also, the CPU 9 detects an AF evaluation value of the focus lens 2 at each position, and determines whether the peak value of the AF evaluation value is larger than the threshold.

The CPU 9 stores necessary control information and data (e.g., threshold) in the ROM 8 and RAM 11.

The CPU 9 selects proper control information from pieces of control information stored in the ROM 8 and CPU 9, and moves the focus lens 2 in accordance with the pick-up situation (still picture pick-up, moving picture pick-up, or still picture pick-up during moving picture pick-up).

Figure 2:
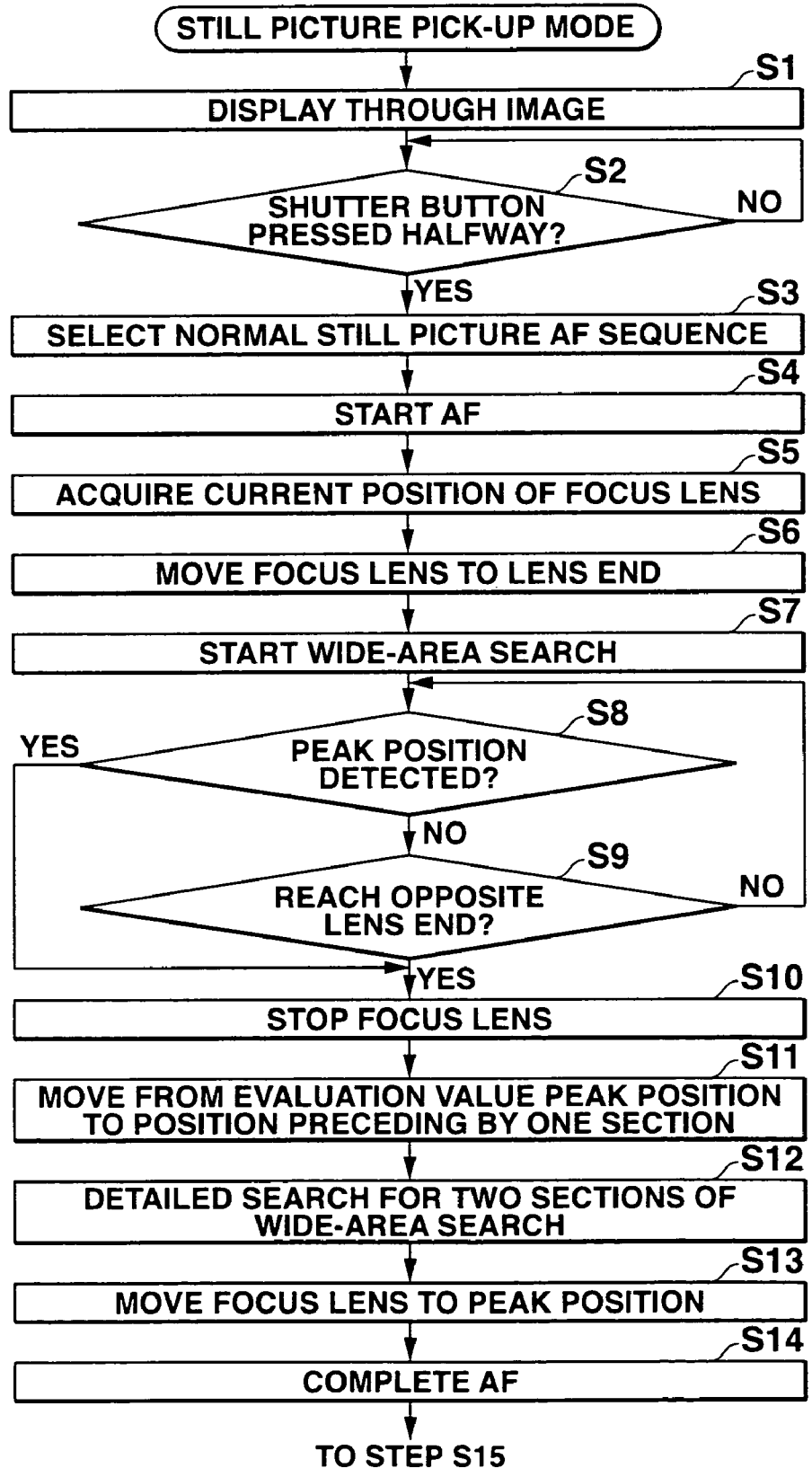
FIG. 2 is a flowchart showing AF operation in a still picture pick-up mode.
Figure 3:
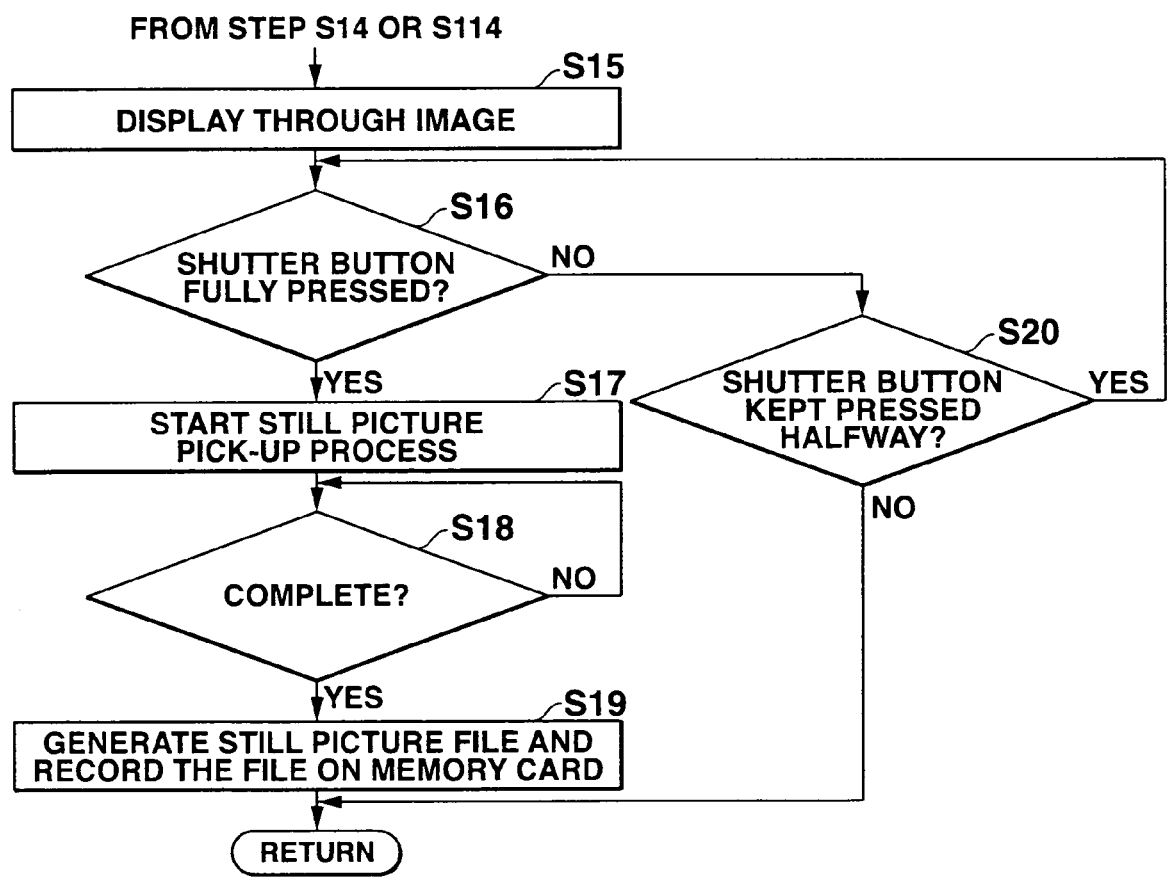
FIG. 3 is a flowchart showing AF operation in the still picture pick-up mode subsequently to FIG. 2.

The operation in the digital camera 1 having the above arrangement will be explained. FIGS. 2 and 3 are flowcharts showing the still picture pick-up processing sequence of the CPU 9 when the user operates the pick-up mode switching key to set a still picture pick-up mode (a normal still picture AF sequence is selected).

To execute AF operation based on contrast detection in accordance with the normal still picture AF sequence, wide-area (rough) search is performed and then detailed search is performed.

Figure 4:
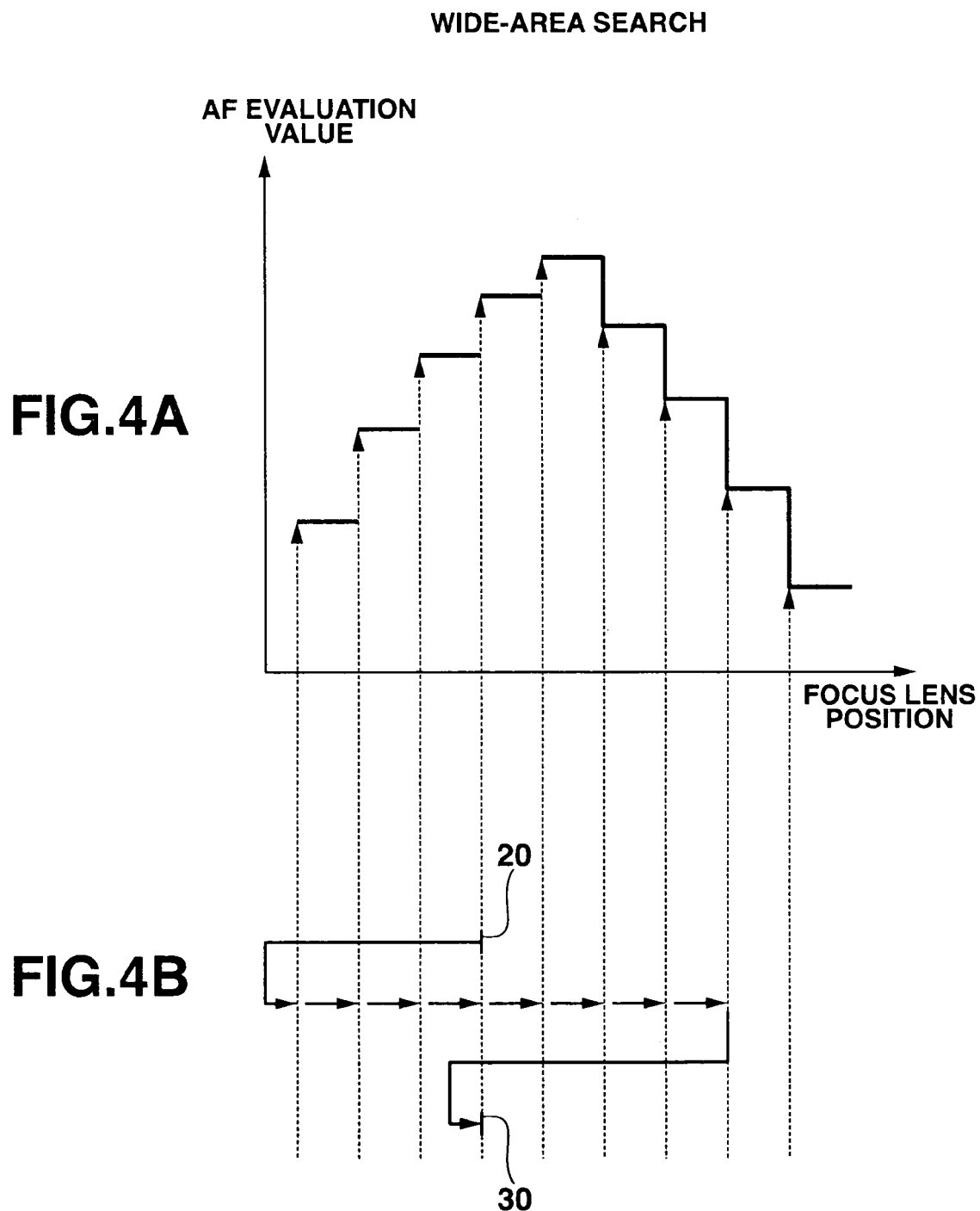
FIGS. 4A and 4B are a graph and view showing the relationship between the focus lens position and the AF evaluation value in wide-area search.

FIG. 4A is a graph showing the relationship between the stop position of the focus lens 2 in wide-area search and an AF evaluation value detected at the stop position. FIG. 4B is a view showing the positional transition of the focus lens 2 in wide-area search. Wide-area search is to detect an AF evaluation value for each section and specify a lens position exhibiting a large AF evaluation value when one moving amount (one section) of the focus lens 2 is large. In FIG. 4B, one moving amount (one section) corresponds to the distance of an arrow between broken lines.

Figure 5:
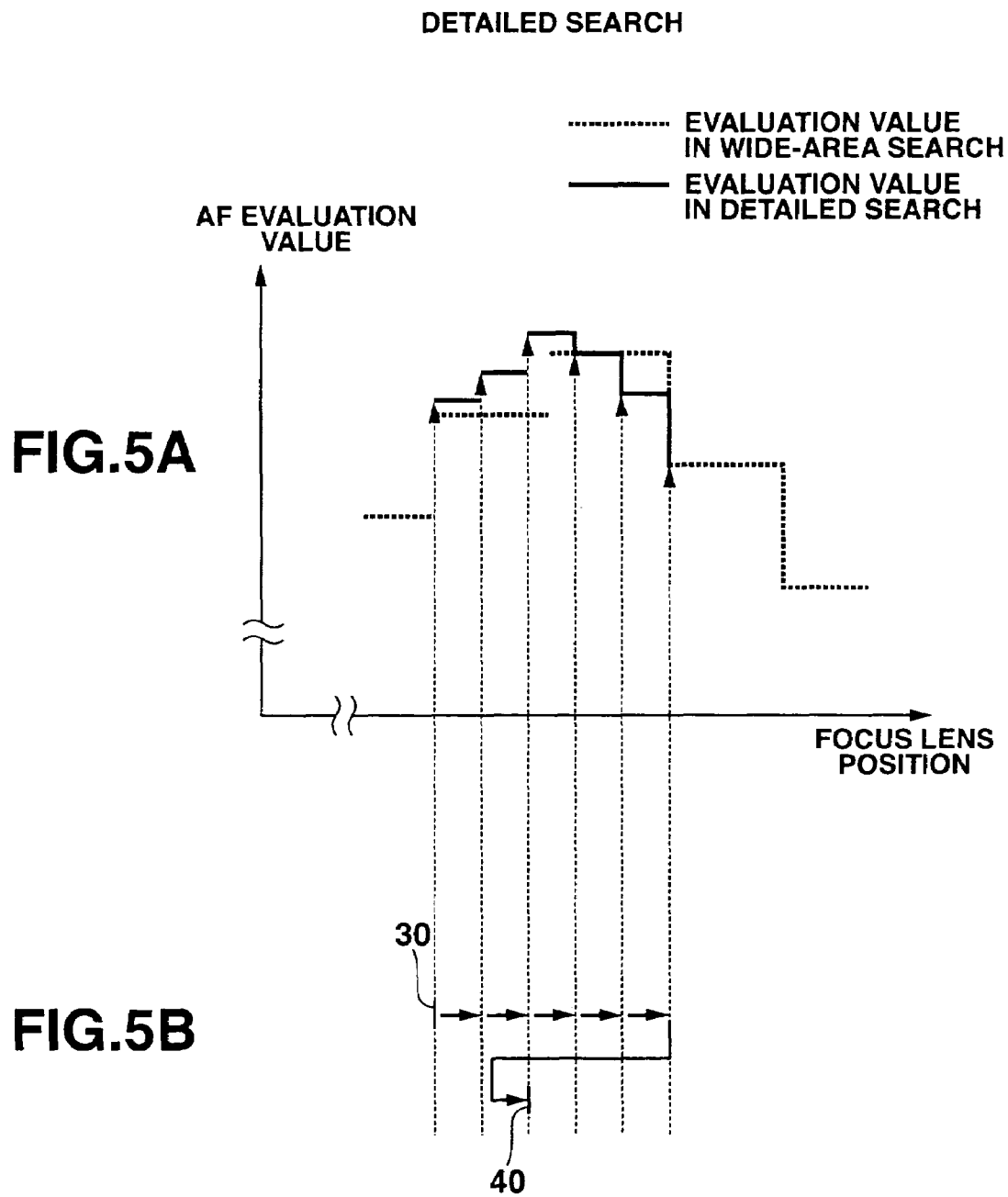
FIGS. 5A and 5B are a graph and view showing the relationship between the focus lens position and the AF evaluation value in detailed search.

FIG. 5A is a graph showing the relationship between the stop position of the focus lens 2 in detailed search and an AF evaluation value detected at the stop position.

FIG. 5B is a view showing the positional transition of the focus lens in detailed search. Detailed search is to detect an AF evaluation value for each section and finally specify a lens position exhibiting the largest AF evaluation value when one moving amount (one section) is smaller than that in wide-area search. One moving amount (one section) corresponds to the distance of an arrow between broken lines in FIG. 5B. Since the AF evaluation value is calculated based on a high-frequency component contained in an image signal, the lens is more accurately focused at a lens position having a larger AF evaluation value. That is, a lens position having the maximum AF evaluation value is an in-focus lens position.

A still picture pick-up process in the still picture pick-up mode (the normal still picture AF sequence is selected) will be first explained with reference to the flowcharts of FIGS. 2 and 3.

When the user operates the pick-up mode switching key of the key input unit 15 to set the still picture pick-up mode, periodic pick-up by the CCD 4 starts in step S1 to display a through image of an object on the image display 10. The user can specify an object to be picked-up by visually checking the through image. In step S2, it is determined whether the shutter button has been pressed halfway. If YES in step S2, the flow advances to step S3 to select a still picture pick-up mode AF sequence (normal still picture AF sequence), and then to step S4. If the shutter button has not be pressed halfway in step S2, the flow stays in step S2 until the button is pressed halfway, and the through image is kept displayed on the image display 10.

In step S4, an AF process starts in accordance with the AF sequence selected in step S3 in order to focus the camera lens on the object. In step S5, the current position (lens position 20 in FIG. 4B) of the focus lens 2 is acquired.

In step S6, the focus lens 2 is moved to a closer one of two lens ends from the acquired current position.

In step S7, the focus lens 2 is moved by each section toward the opposite lens end, and wide-area search to detect an AF evaluation value in each section starts. Wide-area search can detect a lens position exhibiting the largest AF evaluation value.

Note that an AF evaluation value may be detected using all image signals (entire frame) output from the CCD 4. In general, part of the frame (e.g., a predetermined area at the center of the frame, a predetermined area of the frame that is selected by the user, or a predetermined area of the frame that is automatically selected) is set as an AF area. An AF evaluation value is detected using only image signals within the AF area.

During wide-area search, it is determined whether a peak position has been detected (step S8). Further, it is determined whether the focus lens 2 has reached the opposite lens end (step S9).

In step S8, the count by which AF evaluation values sequentially detected along with the movement of the focus lens 2 consecutively decrease is detected. If the consecutive decrease count exceeds a predetermined count (e.g., three) and an AF evaluation value equal to or larger than a predetermined value is detected, a peak position is determined to have already been detected.

If the peak position is determined in step S8 to have been detected, the flow advances to step S10 to stop the focus lens 2 at the current position without moving it to the opposite lens end, and shifts to step S1.

If the focus lens 2 is determined in step S9 to have reached the opposite lens end, the flow advances to step S10 to stop the focus lens 2 at the current position, and then shifts to step S11.

In step S11, the focus lens 2 is moved to position (lens position 30 in FIG. 4B) preceding to the section in which the AF evaluation value is determined largest as a result of wide-area search by one section. This is because detailed search is to be executed near the position at which the AF evaluation value is determined large.

In step S12, detailed search is done in two sections: the section in which the AF evaluation value is determined largest, and its immediately preceding section. This process enables detecting a position of the focus lens 2 at which the AF evaluation value maximizes. In detailed search, an AF evaluation value is detected for each section in which one moving amount (distance of an arrow between broken lines in FIG. 5B) is smaller than that in wide-area search.

Referring to FIGS. 5A and 5B, detailed search is executed in a range of two sections in wide-area search from the lens position 30. The lens position 30 in FIG. 4B and the lens position 30 in FIG. 5B are the same lens position.

In step S13, a lens position which is determined as a result of a digital signal to have the largest AF evaluation value, i.e., the largest high-frequency component is an in-focus lens position. The focus lens 2 is moved to this lens position (lens position 40 in FIG. 5B).

In step S14, the AF process is completed. The AF process up to this step is the same as the prior art.

In step S15, a through image is displayed on the image display 10. The user can specify an object to be picked-up by visually checking the through image.

In step S16, it is determined whether the shutter button has fully been pressed. If YES in step S16, a still picture pick-up process starts in step S17.

More specifically, the flow starts a process of sequentially outputting pixel signals of even-numbered lines and pixel signals of odd-numbered lines in one frame from the CCD 4 at a relatively long output image sensing timing, storing data of all the pixels in the buffer memory (DRAM 7), and compressing the stored image data. In step S18, it is determined whether the process is completed. If YES in step S18, a still picture file (file of the JPEG format or the like) based on the compressed image data is generated, and recorded in the memory card 13 in step S19. The flow then returns to step S1.

If it is determined in step S18 that the still picture pick-up process have not been completed, the flow stays in step S18 until the process is completed.

If it is determined in step S16 that the shutter button have not fully been pressed, it is determined in step S20 whether the shutter button is kept pressed halfway. If YES in step S20, the flow returns to step S16. In other words, if the shutter button is kept pressed halfway, the flow waits until the shutter button is fully pressed.

If it is determined in step S20 that the shutter button is not kept pressed halfway, that is, the half stroke of the shutter button is released, the flow quickly returns to step S1.

In this manner, the still picture pick-up process is performed in the still picture pick-up mode.

In the first embodiment, the normal still picture AF sequence executes rough search first, and then detailed search, but rough search may be omitted. In this case, detailed search is performed while the focus lens is moved from one lens end to the other one (or until a peak position is detected). The focus lens is then moved to a lens position which is determined as a result of detailed search to have the largest AF evaluation value.

A still picture pick-up process and its auto focus control sequence when a still picture is picked-up during moving picture pick-up in a moving picture pick-up mode will be described with reference to the flowcharts of FIGS. 6 to 10.

Figure 6:
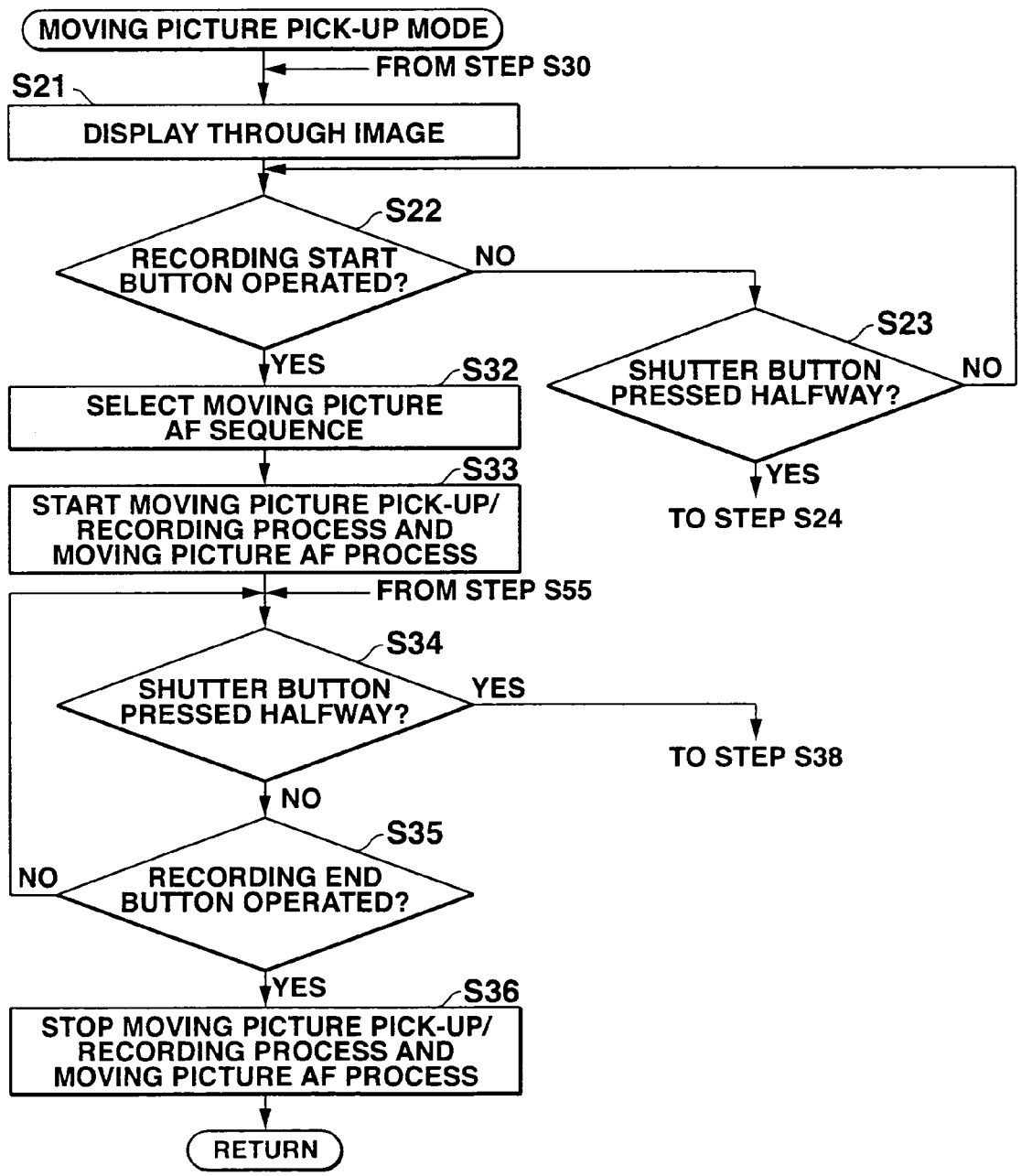
FIG. 6 is a flowchart showing AF operation in a moving picture pick-up mode.

When the user operates the pick-up mode switching key of the key input unit 15 to set the moving picture pick-up mode, periodic pick-up by the CCD 4 starts in step S21 of FIG. 6 to display a through image of an object on the image display 10. The user can specify an object to be picked-up.

In step S22, it is determined whether the recording start button has been operated. If YES in step S22, a moving picture AF sequence is selected in step S32. In step S33, a moving picture pick-up/recording process starts, and a moving picture AF process based on the moving picture AF sequence selected in step S32 starts. If it is determined in step S22 that the recording start button have not been operated, and it is determined in step S23 that the shutter button have not been pressed halfway, the flow returns to step S22. In other words, the through image is kept displayed until the recording start button is operated or the shutter button is pressed halfway.

Figure 7:
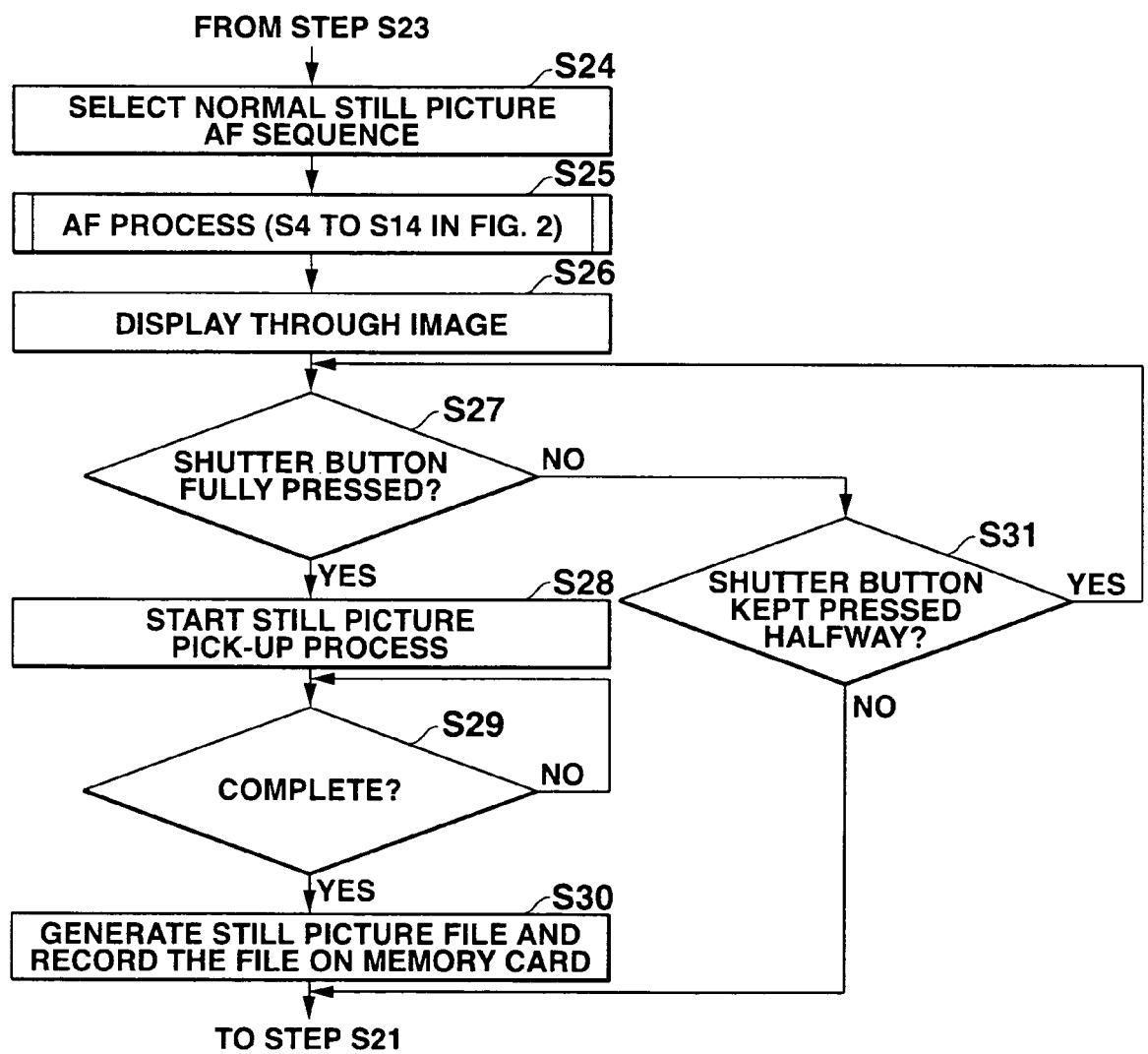
FIG. 7 is a flowchart showing AF operation in the moving picture pick-up mode subsequently to FIG. 6.

If it is determined in step S23 that the shutter button have been pressed halfway, the flow enters a still picture pick-up process shown in FIG. 7. The following description concerns the still picture pick-up process, i.e., an AF process (the normal still picture AF sequence is selected) when a still picture AF process is designated (the shutter button is pressed halfway) while no moving picture pick-up/recording process is performed.

If it is determined in step S22 that the recording start button have not been operated, and it is determined in step S23 that the shutter button have been pressed halfway, the normal still picture AF sequence is selected in step S24 of FIG. 7.

In step S25, an AF process starts in accordance with the selected normal still picture AF sequence in order to focus the camera lens on the object. In step S25, the process is the same as the AF process (steps S4 to S14 in FIG. 2) when a still picture is picked-up in the still picture pick-up mode, as described above, and a detailed description thereof will be omitted.

If the AF process is completed, a through image is displayed on the image display 10 in step S26.

In step S27, it is determined whether the shutter button has fully been pressed. If YES in step S27, a still picture pick-up process starts in step S28. More specifically, the flow starts a process of sequentially outputting pixel signals of even-numbered lines and pixel signals of odd-numbered lines in one frame from the CCD 4 at a relatively long output image sensing timing, storing data of all the pixels in the buffer memory (DRAM 7), and compressing the stored image data. In step S29, it is determined whether the process is completed. If YES in step S29, a still picture file (file of the JPEG format or the like) based on the compressed image data is generated, and recorded in the memory card 13 in step S30. The flow then returns to step S21 to display a through display on the image display 10.

If it is determined in step S29 that the still picture pick-up process have not been completed, the flow stays in step S29 until the process is completed.

If is determined in step S27 that the shutter button have not fully been pressed, it is determined in step S31 whether shutter button is kept pressed halfway. If YES in step S31, the flow returns to step S27. In other words, the flow waits until the shutter button is fully pressed if it is kept pressed halfway.

If it is determined in step S31 that the shutter button is not kept pressed halfway, the flow returns to step S21.

That is, immediately when the half stroke of the shutter button is released, the flow quickly returns to the through image display state in step S21.

The moving picture pick-up/recording process and moving picture AF process which start in step S33 will be explained with reference to FIG. 6.

If is determined in step S22 that the recording start button have been operated, the moving picture AF sequence is selected in step S32. In step S33, the moving picture pick-up/recording process of sensing images (moving image frames) at a predetermined frame rate (fixed period such as 1/30 sec) and recording them in the memory card 13 starts. At the same time, a moving picture AF process based on the moving picture AF sequence selected in step S32 starts. In the moving picture pick-up/recording process, frame images sensed by the CCD 4 at a predetermined frame rate are recorded in the memory card 13 through the buffer memory (DRAM 7) in a moving picture file format such as an MPEG file format or Motion-JPEG file format. Alternatively, only a process of storing frame images sensed by the CCD 4 at a predetermined frame rate in the buffer memory (DRAM 7) may be executed during execution of the moving picture pick-up/recording process. In this case, after the moving picture pick-up/recording process stops, a moving picture file is generated using moving picture data stored in the buffer memory, and recorded in the memory card 13. The moving picture AF process is a continuous AF process of repetitively performing AF operation in a predetermined cycle (in response to a time change, signal component change, or the like). Continuous AF operation always keeps the focus lens 2 near the in-focus lens position during moving picture pick-up. Details of the moving picture AF process based on-the moving picture AF sequence will be described later. In the moving picture AF process, similar to the still picture AF process, an AF evaluation value may be detected using all image signals (entire frame) output from the CCD 4. In general, part of the frame (e.g., a predetermined area at the center of the frame, a predetermined area of the frame that is selected by the user, or a predetermined area of the frame that is automatically selected) is set as an AF area. An AF evaluation value is detected using only image signals within the AF area.

While the moving picture pick-up/recording process and moving picture AF process which have started in step S33 are in progress, it is determined (step S34) whether the shutter button has been pressed halfway. In addition, it is determined (step S35) whether the recording end button has been operated. That is, if it is determined in step S34 that the shutter button have not been pressed halfway, it is determined that still picture pick-up is not required to be performed. In step S35, it is determined whether the recording end button has been operated. If NO in step S35, the flow returns to step S34 to continue the moving picture pick-up/recording process and moving picture AF process. In this case, a through image, i.e., a moving picture during pick-up/recording is kept displayed on the image display 10 even while the moving picture pick-up/recording process and moving picture AF process are executed.

If it is determined in step S35 that the recording end button have been operated, the moving picture pick-up/recording process and moving picture AF process stop in step S36, and the flow returns to the through image display state in step S21.

More specifically, if the recording end button is operated without pressing the shutter button halfway during execution of the moving picture pick-up/recording process and moving picture AF process, the flow advances to step S36 to stop the moving picture pick-up/recording process and moving picture AF process. After that, the flow returns to the through image display state in step S21. When the shutter button is pressed halfway after the operation of the recording end button, the above-described still picture pick-up process when no moving picture pick-up process is done is executed (see FIG. 7).

If it is determined in step S34 that the shutter button have been pressed halfway during execution of the moving picture pick-up/recording process and moving picture AF process, the flow enters a still picture pick-up process and a special still picture AF process for interruption in response to an interrupt during the moving picture pick-up/recording process and moving picture AF process.

A still picture pick-up process (a special AF sequence is selected) when a still picture is picked-up during the moving picture pick-up process will be described with reference to FIGS. 8 to 10.

Figure 11:
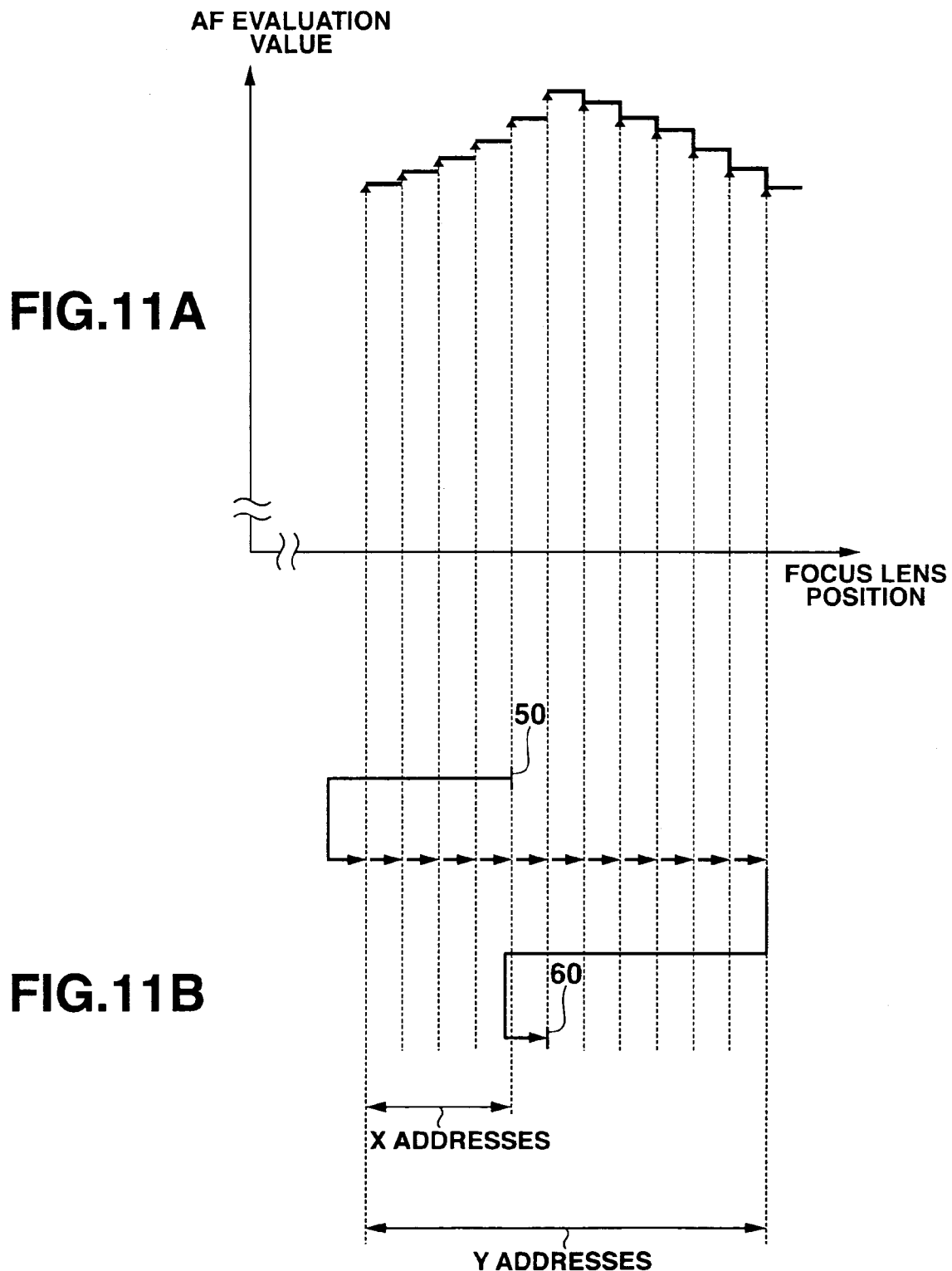
FIGS. 11A and 11B are a graph and view showing the relationship between the focus lens position and the AF evaluation value in a special still picture AF operation for interruption.

FIG. 11A is a graph showing the relationship between the position of the focus lens 2 and an AF evaluation value detected at the stop position in a special still picture AF process (AF search) for interruption. FIG. 11B is a view showing the positional transition of the focus lens 2 in the special still picture AF process for interruption. The special still picture AF process for interruption is an AF process executed when a still picture pick-up process is preformed in response to an interrupt process during moving picture pick-up.

Figure 8:
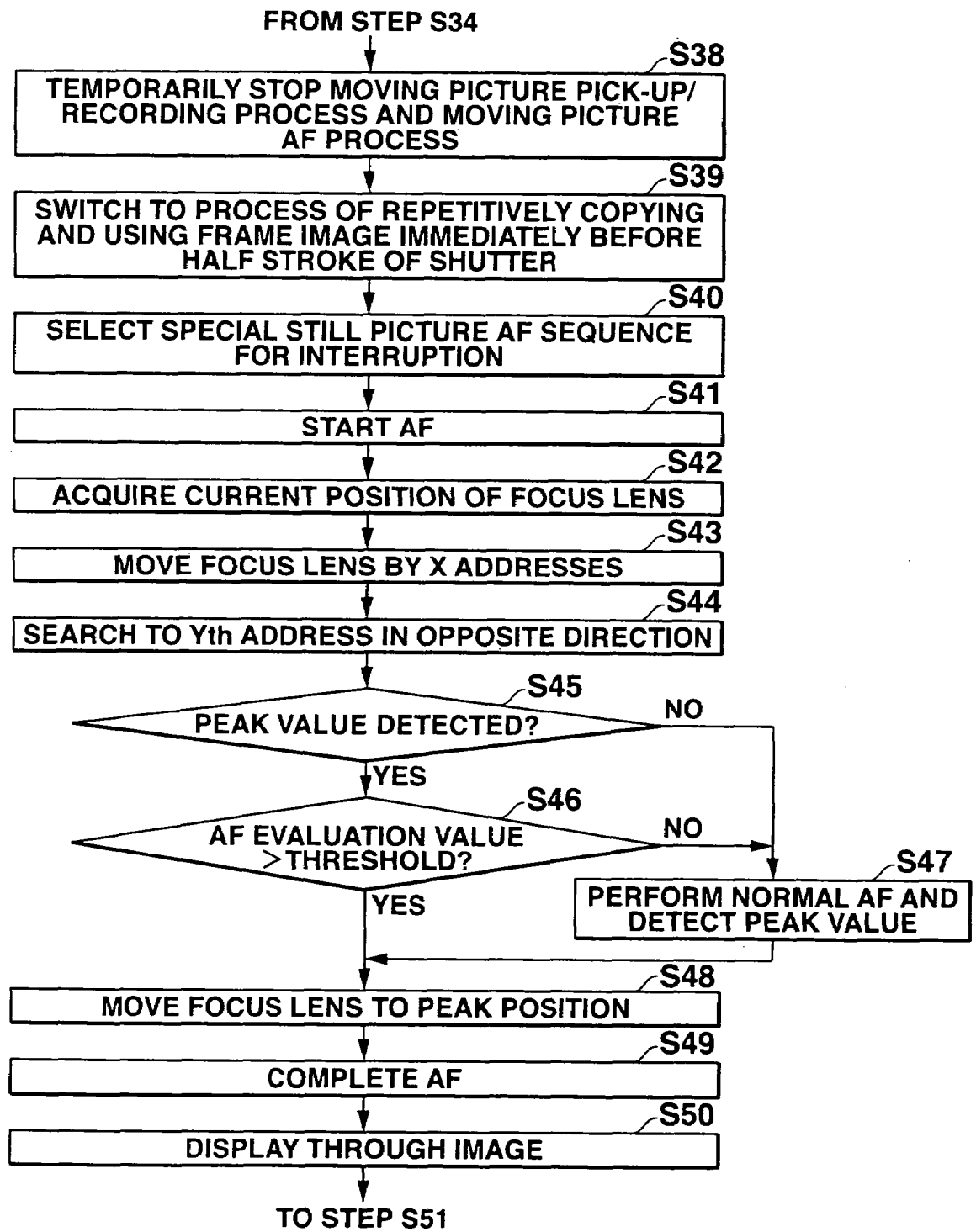
FIG. 8 is a flowchart showing AF operation in the moving picture pick-up mode subsequently to FIG. 6.
Figure 9:
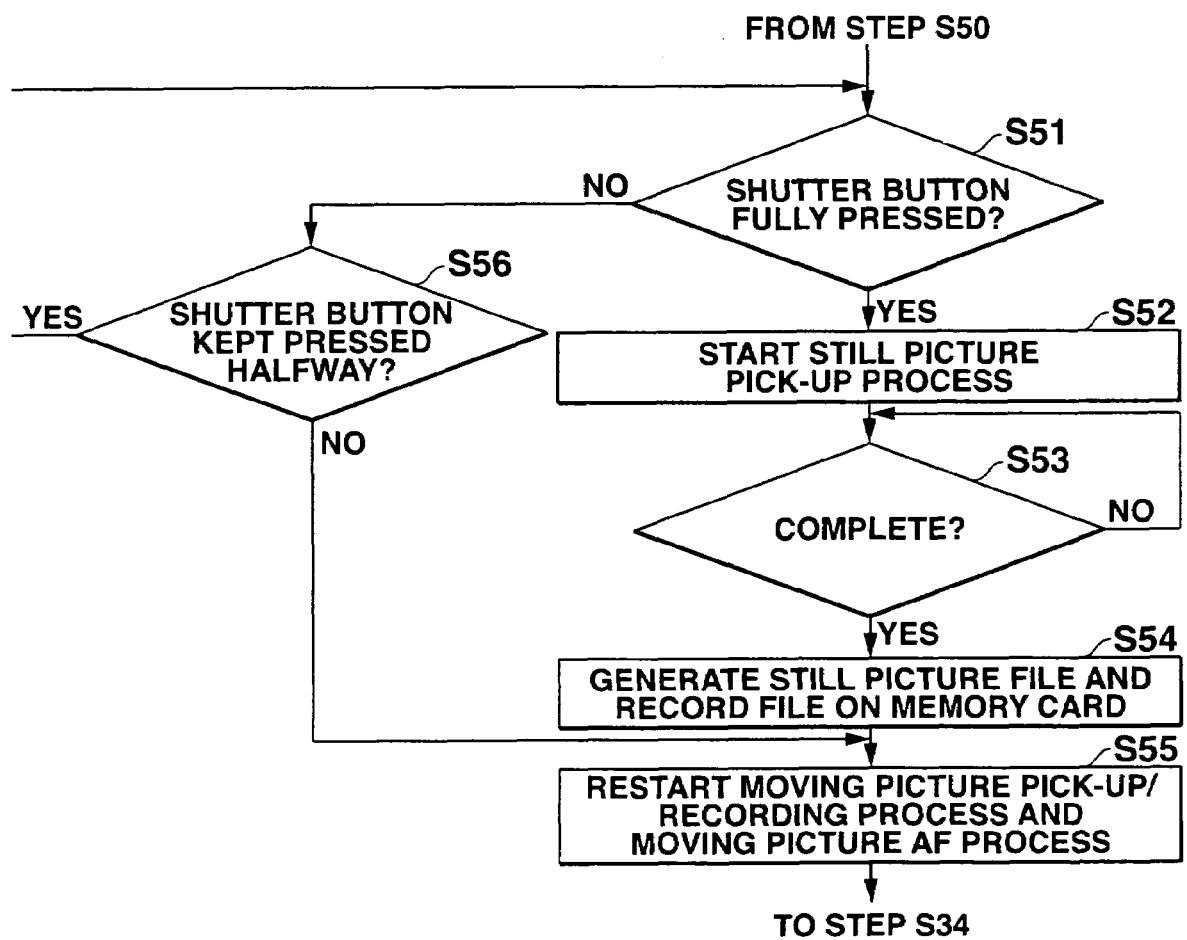
FIG. 9 is a flowchart showing AF operation in the moving picture pick-up mode subsequently to FIG. 8.
Figure 12:
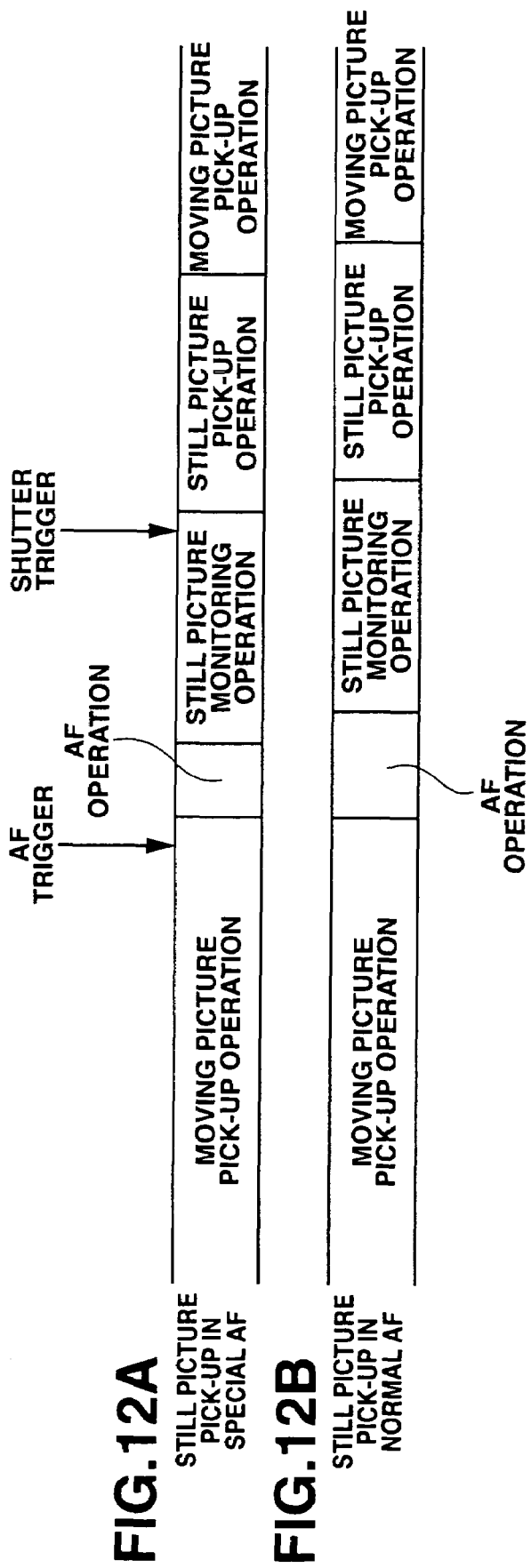
FIGS. 12A and 12B are timing charts of moving picture pick-up by the special still picture AF operation for interruption and normal still picture AF operation.

If it is determined in step S34 that the shutter button have been pressed halfway (AF trigger in FIGS. 12A and 12B), the moving picture pick-up/recording process and moving picture AF process temporarily stop in step S38 of FIG. 8. In step S39, the flow switches to a process of repetitively copying a frame image immediately before the shutter button is pressed halfway, and recording the frame image in the memory card 13.

In step S40, the special still picture AF sequence for interruption is selected. In step S41, an AF process starts in accordance with the selected special still picture AF sequence for interruption. The reason why the AF process is executed in accordance with the special still picture AF sequence for interruption is to shorten the time taken for the AF process. In step S42, the current position (lens position 50 in FIG. 11B) of the focus lens 2 is acquired.

In step S43, the focus lens 2 is moved from the current position toward the lens end by X addresses (see FIG. 11B). At this time, the focus-lens 2 may be moved to a closer or farther lens end. The moving amount (distance) of X addresses is much shorter than the distance from the current position to the lens end. Since one moving amount of the focus lens 2 in the special still picture AF search for interruption corresponds to one address, X addresses correspond to X moving amounts of the focus lens 2. The moving amount of one address may be set equal to one moving amount of the focus lens 2 in detailed search in the normal still picture AF sequence described above.

In step S44, the focus lens 2 is moved for each address by Y addresses from a position to which the focus lens 2 has been moved by X addresses. An AF evaluation value is detected for each address. The focus lens 2 is moved in a direction opposite to the direction in which the focus lens 2 has been moved by X addresses (see FIG. 11A). The moving amount (distance) of Y addresses is much shorter than the distance to an opposite lens end from the position to which the focus lens 2 has been moved by X address.

For this reason, the AF process can be completed within a short time because the focus lens 2 is not moved from one lens end to the other one (no wide-area search is done), that is, the focus lens 2 is moved within only a narrow range. Note that the special still picture AF search for interruption may end when the peak value of the AF evaluation value is detected.

Note that the X and Y values are stored in advance in the ROM 8 or RAM 11 in association with each other. The numbers of stored X and Y values are not limited to one, and plural X and Y values may be stored. This allows selecting X and Y values in accordance with the pick-up situation or the application purpose. By changing the X and Y values, a different AF process, i.e., an AF process suitable for the pick-up situation can be achieved in accordance with the special still picture AF sequence for interruption.

Referring back to FIG. 8, it is determined in step S45 whether a lens position having the largest AF evaluation value, i.e., a peak value has been detected by the special still picture AF search for interruption. As is apparent from FIG. 11A, the AF evaluation value draws a hilly shape in which the AF evaluation value maximizes at a given lens position and decreases as it moves apart from this lens position. A lens position having the largest AF evaluation value is an in-focus lens position. When the AF evaluation value gradually increases and then decreases at a given lens position in sequentially detecting the AF evaluation value while moving the focus lens 2 from the Xth address to the Yth address, an AF evaluation value at the boundary lens position may be determined as a peak value, and AF search may end.

A case in which it is determined in step S45 that the peak value is not detected includes a state in which the AF evaluation value monotonically increases within the AF search range, a state in which it monotonically decrease, and a state in which it is kept unchanged. In other words, no AF evaluation value with a hilly shape can be detected within the AF search range.

If it is determined in step S45 that the peak value of the AF evaluation value has been detected, it is determined in step S46 whether the peak value of the detected AF evaluation value is larger than a preset threshold. This threshold is stored in the RAM 11 or ROM 8. This can ensure detection of the peak value (in-focus lens position).

If it is determined in step S46 that the peak value is larger than the threshold, the flow advances to step S48.

If it is determined in step S45 that the peak value has not been detected, or if it is determined in step S46 that the peak value is smaller than the threshold, the normal still picture AF sequence (AF sequence when a still picture is picked-up in the still picture pick-up mode described above) is selected in step S47. After the peak value (in-focus lens position) is detected in accordance with the selected AF sequence, the flow advances to step S48. Note that determination in step S46 of whether the peak value is larger than the threshold may be omitted. In other words, when the peak value of the AF evaluation value is detected by the special still picture AF search for interruption, the flow may advance to step S48 without determining whether the peak value is larger than the threshold.

In step S48, the focus lens 2 is moved to a lens position determined to have the peak value of the AF evaluation value (in FIG. 11B, a lens position having the largest AF evaluation value, i.e., a lens position 60).

The flow advances to step S49 to complete the AF process.

The flow then shifts to step S50 to display a through image on the image display 10. In step S51 of FIG. 9, it is determined whether the shutter button has fully been pressed. If the shutter button is determined to have fully been pressed, the still picture pick-up process starts in step S52. That is, the flow starts a process of sequentially outputting pixel signals of even-numbered lines and pixel signals of odd-numbered lines in one frame from the CCD 4 at a relatively long output image sensing timing, storing data of all the pixels in the buffer memory (DRAM 7), and JPEG-compressing the stored image data. In step S53, it is determined whether the still picture pick-up process is completed. If YES in step S53, a still picture file (file of the JPEG format or the like) based on the compressed image data is generated, and recorded in the memory card 13 in step S54. The moving picture pick-up/recording process and moving picture AF process restart in step S55, and the flow returns to step S34 of FIG. 6.

If it is determined in step S53 that the still picture pick-up process has not been completed, the flow stays in step S53 until the process is completed.

If it is determined in step S51 that the shutter button has not fully been pressed, it is determined in step S56 whether the shutter button is kept pressed halfway. If YES in step S56, the flow returns to step S51. In other words, if the shutter button is kept pressed halfway, the flow waits until the shutter button is fully pressed.

If it is determined in step S56 that the shutter button is not kept pressed halfway, that is, it is determined that the half stroke of the shutter button has been released, the flow quickly advances to step S55 to restart the moving picture pick-up/recording process and moving picture AF process, and then returns to step S34.

Details of the moving picture AF process which starts in step S33 of FIG. 6 based on the moving picture AF sequence will be described with reference to the flowchart of FIG. 10.

In step S81, it is determined whether a timing at which the AF process is executed has come. The timing at which the AF process is executed comes periodically (at an interval of, e.g., 5 sec).

If it is determined in step S81 that the timing at which the AF process is executed has come, an AF evaluation value at the current lens position is acquired in step S82. The acquired AF evaluation value is stored together with information on the lens position at which the AF evaluation value is acquired.

In step S83, the focus lens 2 is moved by a small amount in a predetermined direction. In step S84, an AF evaluation value at a lens position after movement is acquired.

The AF evaluation value acquired in step S82 and the AF evaluation value acquired in step S84 are compared (step S85), and it is determined by the comparison process (step S86) whether the AF evaluation value increases.

If it is determined in step S86 that the AF evaluation value increases, the focus lens 2 is moved in the same direction as the previous moving direction of the focus lens 2 in step S87. In step S89, an AF evaluation value at a lens position after movement is acquired.

If it is determined in step S86 that the AF evaluation value decreases, the focus lens 2 is moved in a direction opposite to the previous moving direction of the focus lens 2 in step S88. In step S89, an AF evaluation value at a lens position after movement is acquired.

In step S90, the previously acquired AF evaluation value and the currently acquired AF evaluation value are compared. It is determined by the comparison process (step S91) whether the AF evaluation value decreases.

If it is determined in step S91 that the AF evaluation value increases, the flow returns to step S87 to repeat the processes in steps S87 to S90 until it is determined in step S91 that the AF evaluation value decreases.

If it is determined in step S91 that the AF evaluation value decreases, the focus lens 2 is moved to a lens position at which the largest AF evaluation value among acquired AF evaluation values is acquired. Thereafter, the flow returns to step S81 to wait till the timing at which the next AF process is executed.

An in-focus state can therefore be maintained while the moving picture pick-up/recording process is executed by the above-described moving picture AF process.

Figure 10:
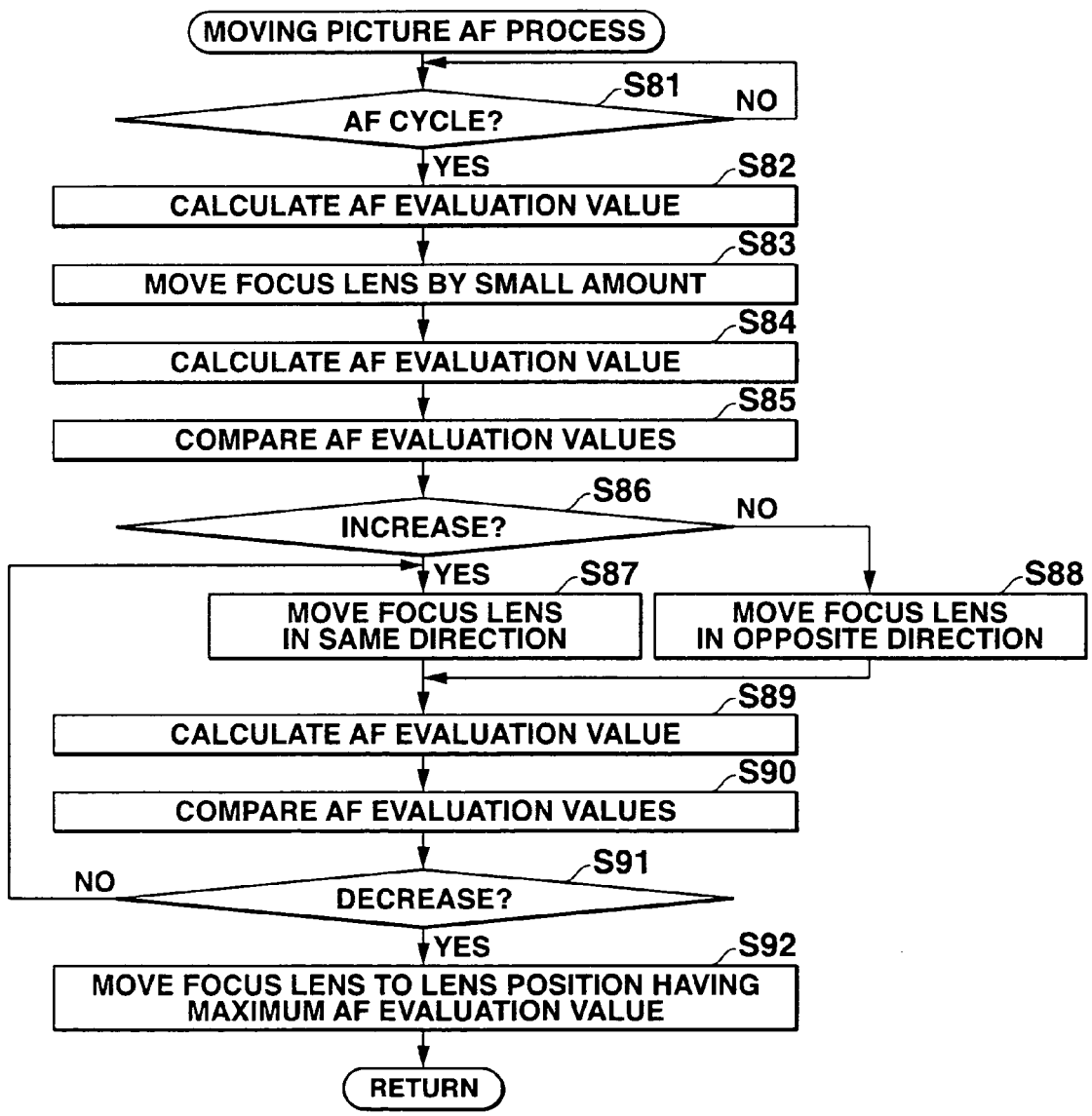
FIG. 10 is a flowchart showing a moving picture AF process which starts in step S33 of FIG. 6.

In the flowchart of FIG. 10, the AF process is repeated at a predetermined time interval. Alternatively, an AF evaluation value at the current lens position may be acquired periodically (or always), and when the acquired AF evaluation value changes by a predetermined value or more, the AF process may be repetitively executed.

When the user selects X and Y values, the special still picture AF operation for interruption may be done based on the selected X and Y values.

Second Embodiment

The second embodiment of the present invention will be described.

A digital camera according to the second embodiment searches for an in-focus lens position by moving a focus lens 2 within a narrow range when a still picture AF process is designated while a through image is displayed. More specifically, a moving picture AF process is executed during the through image display process. When the shutter button is pressed halfway during the through image display process, the special still picture AF search for interruption that has been described in the first embodiment is performed.

The second embodiment also employs a digital camera having the same arrangement as that shown in FIG. 1 except that the function of each building component is different.

The CPU 9 designates the start of still picture AF operation when the user presses halfway the shutter button of a key input unit 15.

The CPU 9 determines whether execution of still picture pick-up AF operation has been designated in a state (through image display state) in which periodic AF operation (continuous AF process) is done.

To execute still picture AF operation when periodic AF operation (moving picture AF operation) is performed, AF operation which is periodically done at a predetermined timing (in response to a time change, signal component change, or the like) is aborted. A control signal is sent to the motor driving block 14 to move the focus lens 2 within a narrow range. In other words, still picture AF operation starts.

Simultaneously when the focus lens 2 is moved within a narrow range, the CPU 9 detects an AF evaluation value at a predetermined interval.

The functions of the remaining units are the same as those described in the first embodiment, and a description thereof will be omitted.

Figure 13:
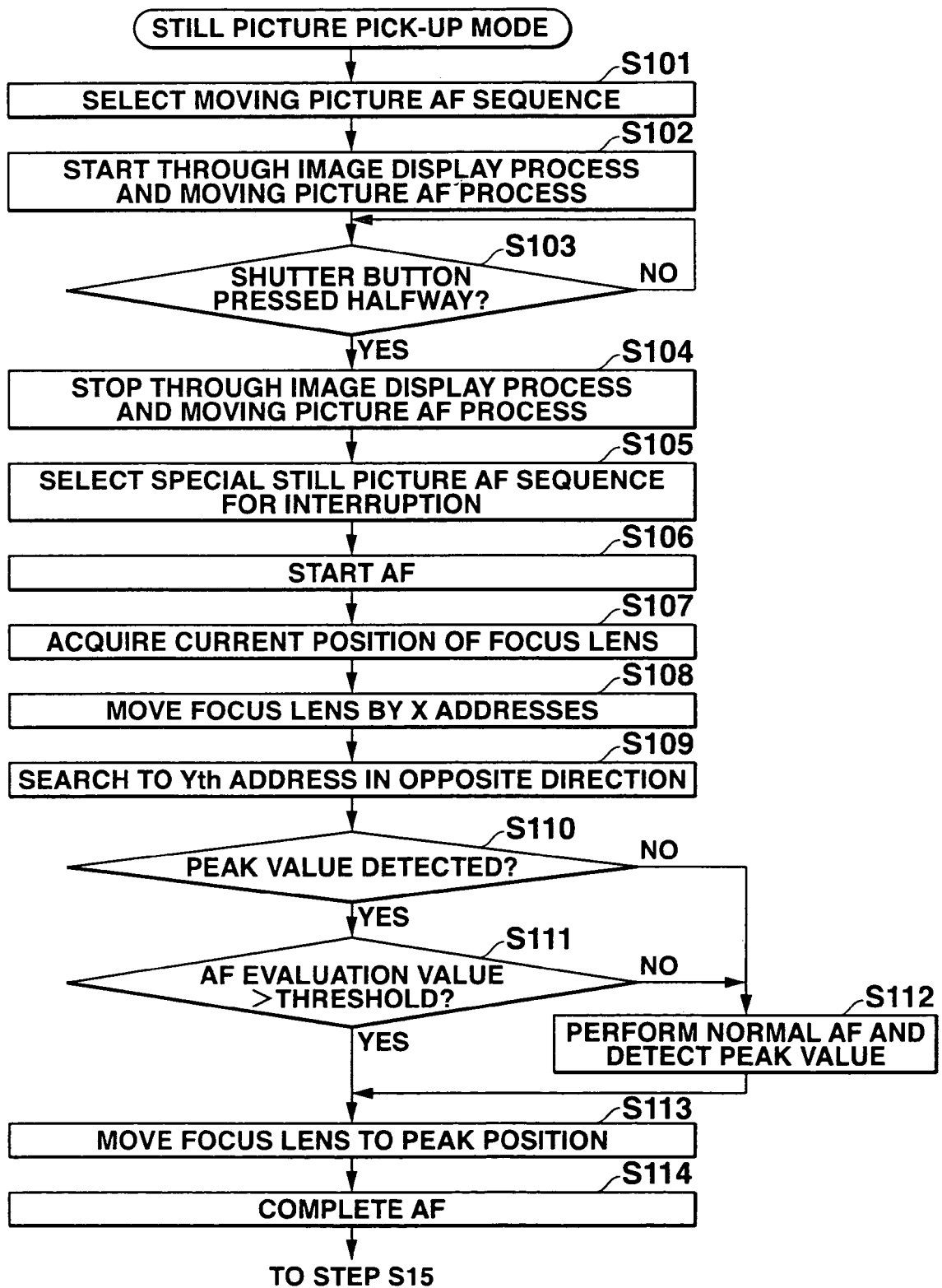
FIG. 13 is a flowchart showing another AF operation in the still picture pick-up mode.

The operation in the digital camera 1 having the above arrangement and functions will be explained. A description which overlaps the first embodiment will be omitted. FIG. 13 is a flowchart showing the still picture pick-up processing sequence (including AF operation) of the CPU 9 when the user operates the pick-up mode switching key of the key input unit 15 to set a still picture pick-up mode.

Still picture pick-up AF operation in the still picture pick-up mode will be described with reference to the flowchart of FIG. 13.

When the user operates the pick-up mode switching key of the key input unit 15 to set the still picture pick-up mode, a moving picture AF sequence is selected in step S101.

In step S102, a moving picture pick-up/display process of displaying a through image on the image display 10 starts. At the same time, a moving picture AF process starts in accordance with the moving picture AF sequence selected in step S101. In the moving picture pick-up/display process, a frame image sensed by the CCD 4 at a predetermined frame rate is displayed on the image display 10 without recording it in the memory card 13 through the buffer memory (DRAM 7). The moving picture AF process is the same as the moving picture AF process (see FIG. 10) described in the first embodiment.

It is determined (step S103) whether the shutter button has been pressed halfway while the moving picture pick-up/display process and moving picture AF process are executed. If YES in step S103, the moving picture pick-up/display process and moving picture AF process stop (step S104), and a special still-picture AF sequence for interruption is selected (step S105).

A special still picture AF process for interruption starts in accordance with the special still picture AF sequence for interruption that is selected in step S105 (step S106).

Thereafter, the current lens position of the focus lens 2 is acquired (step S107), and the focus lens 2 is moved by X addresses from the acquired current lens position (step S108). The focus lens 2 is moved by Y addresses in an opposite direction from a position to which the focus lens 2 has been moved by X addresses. During movement, an AF evaluation value is detected at a predetermined interval (step S109). If a peak value is detected (YES in step S110), it is determined (step S111) whether the peak value is larger than the threshold. If YES in step S111, the focus lens 2 is moved to a lens position at which the peak value has been detected (step S113).

If it is determined in step S110 that the peak value has not been detected, or it is determined in step S111 that the peak value is smaller than the threshold, AF operation using a normal still picture sequence is executed to detect a peak value (step S112). The focus lens 2 is moved to a lens position at which the peak value has been detected (step S113).

The AF process is completed (step S114), and the flow advances to step S15 in FIG. 3 to perform a still picture pick-up process. This operation has been described above, and a description thereof will be omitted.

If the start of still picture AF operation is designated during the moving picture pick-up/recording process, the special still picture AF operation for interruption is executed, as described in the first embodiment.

Also when the start of still picture AF operation is designated while no moving picture pick-up/recording process is done in the moving picture pick-up mode, i.e., during the through image display process (and moving picture AF operation), the special still picture AF operation for interruption is executed (step S25 in FIG. 7).

More specifically, the second embodiment performs the special still picture AF operation for interruption upon designation of the start of still picture AF operation during the moving picture pick-up/recording process, and also upon designation of the start of still picture AF operation during the moving picture pick-up process of displaying a through image. Some digital cameras perform AF operation (continuous AF operation) at a predetermined time interval in the through image display mode. Since the focus lens is located near an in-focus position, the AF operation time can be shortened by AF search within a narrow range.

Plural X and Y values may be stored, and different X and Y values may be selected for designation of the start of still picture AF operation during the moving picture pick-up/recording process and designation of the start of still picture AF operation during the moving picture pick-up process of displaying a through image. Accordingly, X and Y values can be selected in accordance with the pick-up situation or the application purpose.

When the user selects X and Y values, the special still picture AF operation for interruption may be done based on the selected X and Y values.

In the first and second embodiments, the still picture pick-up process is executed by the interrupt process when still picture pick-up is designated during the moving picture pick-up/recording process or through image display process. A moving picture frame or through image may be recorded as a still picture when still picture pick-up is designated.

In the first and second embodiments, the special still picture AF operation for interruption is executed in response to a half stroke of the shutter button during the moving picture pick-up/recording process or through image display process. The still picture pick-up process is executed in response to a subsequent full stroke of the shutter button. Alternatively, an AF process by the special still picture AF sequence for interruption may start in response to a full stroke of the shutter button, and after the completion of the AF process, the still picture pick-up process may be executed.

In the first and second embodiments, the AF process by the special still picture AF sequence for interruption starts after the focus lens is temporarily moved to the Xth address at the start of the AF process. The AF process may immediately start at the current focus lens position. For example, when the shutter button is pressed halfway during the moving picture pick-up/recording process or through image display process, the same AF process as the moving picture AF process shown in FIG. 10 may start.

In the first and second embodiments, if a peak position is detected during execution of a contrast AF process while the focus lens is moved from one lens end to the other one in an AF process based on the normal still picture AF sequence, the focus lens is moved to an in-focus lens position without moving it to the other lens end. Alternatively, AF operation may be executed while the focus lens is always moved from one lens end to the other one without stopping it. Then, the focus lens may be moved to a lens position exhibiting the largest AF evaluation value, i.e., an in-focus lens position.

The image sensing apparatus according to the present invention is not limited to the above-described embodiments, and may be applied to a cellular phone, watch or PDA with a pick-up function, a movie camera with a still picture sensing function, and a camera-equipped personal computer as long as the device comprises the AF function.

What is claimed is:

1. An image sensing apparatus comprising:
   an image sensor which senses an object image which is incident through a focus lens;
   an auto focus unit which moves the focus lens along an optical axis and moves the focus lens to an in-focus lens position based on an image sensing signal output from the image sensor during movement of the focus lens;
   a moving picture pick-up control unit which causes the image sensor to execute a moving picture pick-up process;
   a first auto focus control unit which causes the auto focus unit to execute a first auto focus process for moving picture pick-up when the moving picture pick-up control unit executes the moving picture pick-up process;
   an auto focus designation unit which designates a start of an auto focus process for still picture pick-up when the moving picture pick-up control unit executes the moving picture pick-up process;
   a second auto focus control unit which causes the auto focus unit to execute a second auto focus process for still picture pick-up when the auto focus designation unit designates the start of the auto focus process, and which causes the auto focus unit to limit movement of the focus lens within a moving range that is narrower than a movable range of the focus lens;
   a determination unit which determines whether the first auto focus control unit executes the first auto focus process when the auto focus designation unit designates the start of the auto focus process; and
   a third auto focus control unit which causes the auto focus unit to execute a third auto focus process for still picture pick-up in which a moving range of the focus lens is wider than the moving range of the focus lens in the second auto focus process, when the determination unit determines that the first auto focus control unit does not execute the first auto focus process;
   wherein the third auto focus control unit: (i) detects a peak lens position based on the image sensing signal output from the image sensor at a predetermined step interval while moving the focus lens from a first lens end to a second lens end, (ii) moves the focus lens close to the detected peak lens position, (iii) then detects a peak lens position based on the image sensing signal output from the image sensor at a step interval shorter than the predetermined step interval while moving the focus lens within a narrow range near the peak lens position, and (iv) moves the focus lens close to the detected peak lens position.

2. An apparatus according to claim 1, wherein the second auto focus control unit causes the auto focus unit to limit movement of the focus lens within a narrow range based on a focus lens position when the auto focus designation unit designates the start of the auto focus process.

3. An apparatus according to claim 1, wherein the second auto focus control unit inhibits the auto focus unit from performing at least an initial process of temporarily moving the focus lens to one of the lens ends.

4. An apparatus according to claim 1, wherein the second auto focus control unit causes the auto focus unit to execute a process of temporarily moving the focus lens by a first number of steps and then moving the focus lens by a second number of steps in an opposite direction when the auto focus designation unit designates the start of the auto focus process.

5. An apparatus according to claim 1, further comprising:
   a second determination unit which determines whether auto focus control by the second auto focus control unit is successful;
   wherein the third auto focus control unit which causes the auto focus unit to execute the third auto focus process when the second determination unit determines that auto focus control by the second auto focus control unit fails.

6. An apparatus according to claim 1, wherein the first auto focus control unit causes the auto focus unit to periodically move the focus lens by a small amount.

7. An apparatus according to claim 1, further comprising a display unit which displays a moving picture acquired in the moving picture pick-up process by the moving picture pick-up control unit.

8. An apparatus according to claim 1, further comprising a memory which stores a moving picture acquired in the moving picture pick-up process by the moving picture pick-up control unit.

9. An apparatus according to claim 1, further comprising:
   a moving picture pick-up designation unit which designates a start of the moving picture pick-up process by the moving picture pick-up control unit,
   wherein the moving picture pick-up control unit causes the image sensor to execute the moving picture pick-up process when the moving picture pick-up designation unit designates the start of moving picture pick-up.

10. An apparatus according to claim 1, further comprising:
    a shutter button capable of half stroke operation and full stroke operation,
    wherein the auto focus designation unit designates the start of the auto focus process when the shutter button is pressed halfway.

11. An apparatus according to claim 1, further comprising:
    a still picture pick-up designation unit which designates a start of still picture pick-up; and
    a still picture pick-up control unit which causes the image sensor to execute a still picture pick-up process when the still picture pick-up designation unit designates the start of still picture pick-up.

12. An apparatus according to claim 11, wherein the moving picture pick-up control unit causes the image sensor to execute the moving picture pick-up process after the still picture pick-up control unit executes the still picture pick-up process.

13. An apparatus according to claim 11, further comprising:
    a shutter button capable of half stroke operation and full stroke operation,
    wherein the auto focus designation unit designates the start of the auto focus process when the shutter button is pressed halfway, and the still picture pick-up designation unit designates the start of still picture pick-up when the shutter button is fully pressed.

14. An apparatus according to claim 11, further comprising a memory which stores a still picture acquired in the still picture pick-up process by the still picture pick-up control unit.

15. An apparatus according to claim 1, wherein the auto focus designation unit further designates a start of still picture pick-up, and wherein the apparatus further comprises a still picture pick-up control unit that causes the image sensor to execute a still picture pick-up process when the auto focus designation unit designates the start of still picture pick-up.

16. An apparatus according to claim 1, wherein the third auto focus control unit ends the third auto focus process without moving the focus lens to the second lens end when the peak lens position is detected.

17. An apparatus according to claim 1, wherein the second auto focus control unit causes the auto focus unit to execute the second auto focus process when the determination unit determines that the first auto focus control unit executes the first auto focus process.

18. An image sensing apparatus comprising:
means for sensing an object image which is incident through a focus lens;
auto focus means for moving the focus lens along an optical axis and moving the focus lens to an in-focus lens position based on an image sensing signal output from the sensing means during movement of the focus lens;
moving picture pick-up control means for causing the sensing means to execute a moving picture pick-up process;
first auto focus control means for causing the auto focus means to execute a first auto focus process for moving picture pick-up when the moving picture pick-up control means executes the moving picture pick-up process;
auto focus designation means for designating a start of an auto focus process for still picture pick-up when the moving picture pick-up control means executes the moving picture pick-up process;
second auto focus control means for causing the auto focus means to execute a second auto focus process for still picture pick-up when the auto focus designation means designates the start of the auto focus process, and for causing the auto focus means to limit movement of the focus lens within a moving range that is narrower than a movable range of the focus lens;
determination means for determining whether the first auto focus control means executes the first auto focus process when the auto focus designation means designates the start of the auto focus process; and
third auto focus control means for causing the auto focus means to execute a third auto focus process for still picture pick-up in which a moving range of the focus lens is wider than the moving range of the focus lens in the second auto focus process, when the determination means determines that the first auto focus control means does not execute the first auto focus process;
wherein the third auto focus control means: (i) detects a peak lens position based on the image sensing signal output from the sensing means at a predetermined step interval while moving the focus lens from a first lens end to a second lens end, (ii) moves the focus lens close to the detected peak lens position, (iii) then detects a peak lens position based on the image sensing signal output from the sensing means at a step interval shorter than the predetermined step interval while moving the focus lens within a narrow range near the peak lens position, and (iv) moves the focus lens close to the detected peak lens position.

19. An auto focus method, for an image sensing apparatus comprising an image sensor which senses an object which is incident through a focus lens, the method comprising:
causing the image sensor to execute a moving picture pick-up process, and performing a contrast auto focus process for moving picture pick-up;
designating a start of a contrast auto focus process for still picture pick-up when the moving picture pick-up process and the contrast auto focus process for a moving picture pick-up are executed;
determining whether the contrast auto focus process for moving picture pick-up is executed when the start of the contrast auto focus for still picture pick-up is designated;
performing a first contrast auto focus process for still picture pick-up, in which movement of the focus lens is limited within a moving range narrower than a movable range of the focus lens, when the start of the contrast auto focus process for still picture pick-up is designated and it is determined that the contrast auto focus process for moving picture pick-up is executed; and
performing a second contrast auto focus process for still picture pick-up, in which a moving range of the focus lens is wider than the moving range of the focus lens in the first contrast auto focus process for still picture pick-up, when the start of the contrast auto focus process for still picture pick-up is designated and it is determined that the contrast auto focus process for moving picture pick-up is not executed;
wherein the second contrast auto focus process for still picture pick-up comprises: (i) detecting a peak lens position based on the image sensing signal output from the image sensor at a predetermined step interval while moving the focus lens from a first lens end to a second lens end, (ii) moving the focus lens close to the detected peak lens position, (iii) then detecting a peak lens position based on the image sensing signal output from the image sensor at a step interval shorter than the predetermined step interval while moving the focus lens within a narrow range near the peak lens position, and (iv) moving the focus lens close to the detected peak lens position.

20. An article of manufacture comprising a computer usable medium having an auto focus control program stored thereon that is executable by a computer of an image sensing apparatus comprising an image sensor which senses an object image which is incident through a focus lens, wherein the program is executable by the computer to cause the computer to perform functions comprising:
causing the image sensor to execute a moving picture pick-up process, and performing a contrast auto focus process for moving picture pick-up; designating a start of a contrast auto focus process for still picture pick-up when the moving picture pick-up process and the contrast auto focus process for a moving picture pick-up are executed;
performing a first contrast auto focus process for still picture pick-up, in which movement of the focus lens is limited within a moving range narrower than a movable range of the focus lens, when the start of the contrast auto focus process for t-9~e still picture pick-up is designated and it is determined that the contrast auto focus process for moving picture pick-up is executed; and performing a second contrast auto focus process for still picture pick-up, in which a moving range of the focus lens is wider than the moving range of the focus lens in the first contrast auto focus process for still picture pick-up, when the start of the contrast auto focus process for still picture pick-up is designated and it is determined that the contrast auto focus process for moving picture pick-up is not executed; wherein the second contrast auto focus process for still picture pick-up comprises: (i) detecting a peak lens position based on the image sensing signal output from the image sensor at a predetermined step interval while moving the focus lens from a first lens end to a second lens end, (ii) moving the focus lens close to the detected peak lens position, (iii) then detecting a peak lens position based on the image sensing signal output from the image sensor at a step interval shorter than the predetermined step interval while moving the focus lens within a narrow range near the peak lens position, and (iv) moving the focus lens close to the detected peak lens position.

* * * * *